(12) United States Patent
Deck

(10) Patent No.: US 12,723,917 B2
(45) Date of Patent: Sep. 1, 2026

(54) METHODS AND SYSTEMS FOR ALIGNING AN OPTICAL INSTRUMENT

(71) Applicant: Thermo Electron Scientific Instruments LLC, Madison, WI (US)

(72) Inventor: Francis J. Deck, Madison, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 297 days.

(21) Appl. No.: 18/541,511

(22) Filed: Dec. 15, 2023

(65) Prior Publication Data

US 2025/0198841 A1 Jun. 19, 2025

(51) Int. Cl.

| | |
|---|---|
| ***G01J 3/02*** | (2006.01) |
| ***G01J 3/44*** | (2006.01) |
| ***G02B 21/04*** | (2006.01) |
| ***G02B 21/26*** | (2006.01) |
| ***G02F 1/29*** | (2006.01) |

(52) U.S. Cl.

CPC ........... *G01J 3/0289* (2013.01); *G01J 3/0297* (2013.01); *G01J 3/44* (2013.01); *G02F 1/291* (2021.01); *G02B 21/04* (2013.01); *G02B 21/26* (2013.01); *G02F 2203/24* (2013.01); *G02F 2203/69* (2013.01)

(58) Field of Classification Search

None

See application file for complete search history.

(56) References Cited

U.S. PATENT DOCUMENTS

| | | | | |
|---|---|---|---|---|
| 5,444,512 | A * | 8/1995 | Morizumi | G03B 5/00 396/75 |
| 6,018,420 | A * | 1/2000 | Hirunuma | G02B 23/02 359/557 |
| 6,057,962 | A * | 5/2000 | Hirunuma | G02B 27/646 359/557 |
| 6,661,509 | B2 * | 12/2003 | Deck | G02B 21/0076 356/399 |
| 7,460,229 | B2 * | 12/2008 | Deck | G02B 7/003 356/399 |
| 10,114,204 | B2 * | 10/2018 | Fretel | G02B 21/0048 |
| 10,983,334 | B2 * | 4/2021 | Coffin | G02B 7/182 |

(Continued)

OTHER PUBLICATIONS

EP24219147.6, Extended European Search Report, May 8, 2025, 9 pages.

*Primary Examiner* — Ryan Crockett

(74) *Attorney, Agent, or Firm* — Michael Best & Friedrich LLP

(57) ABSTRACT

An optical steering mechanism and methods for using the same. One optical steering mechanism includes a first lens defining a first focal length having a first magnitude and a first polarity and a second lens defining a second focal length having a second magnitude and a second polarity. The first and second magnitudes are substantially equal and the first and second polarities are opposite, and wherein the second lens is positioned to directly receive an optical beam passing through the first lens. The optical beam steering mechanism also includes at least one rotary motor coupled to one of the first lens and the second lens and configured to swing the lens coupled thereto in an arcuate path. An optical beam path of the optical beam passed through the second lens is adjustable by operating the rotary motor.

17 Claims, 6 Drawing Sheets

(56) References Cited

U.S. PATENT DOCUMENTS

| | | | | |
|---|---|---|---|---|
| 11,860,380 | B1 * | 1/2024 | Zhou | G02B 27/62 |
| 2003/0184748 | A1 * | 10/2003 | McCarthy | G01J 3/2823 |
| | | | | 356/328 |
| 2004/0190098 | A1 * | 9/2004 | Hama | G02B 26/125 |
| | | | | 359/210.1 |
| 2019/0353920 | A1 * | 11/2019 | Mason | G01J 3/06 |

* cited by examiner

METHODS AND SYSTEMS FOR ALIGNING AN OPTICAL INSTRUMENT

FIELD OF THE INVENTION

The present disclosure relates to methods and systems for aligning an optical instrument, and more particularly, to aligning one or more beam paths of a microscope, such as a Raman microscope.

SUMMARY

In one aspect, the disclosure provides an optical beam steering mechanism comprising a first lens defining a first focal length having a first magnitude and a first polarity and a second lens defining a second focal length having a second magnitude and a second polarity. The first and second magnitudes are substantially equal and the first and second polarities are opposite, and wherein the second lens is positioned to directly receive an optical beam passing through the first lens. The optical beam steering mechanism also comprises at least one rotary motor coupled to one of the first lens and the second lens and configured to swing the lens coupled thereto in an arcuate path. An optical beam path of the optical beam passed through the second lens is adjustable by operating the rotary motor.

In another aspect, the disclosure provides an optical instrument comprising a source of electromagnetic radiation generating an optical beam, a sample stage for holding a sample, a detector for receiving light from the sample, at least one optical beam steering mechanism. The optical beam steering mechanism comprising a first lens defining a first focal length having a first magnitude and a first polarity and a second lens defining a second focal length having a second magnitude and a second polarity. The first and second magnitudes are substantially equal and the first and second polarities are opposite, and wherein the second lens is positioned to directly receive an optical beam passing through the first lens. The optical beam steering mechanism also comprises at least one rotary motor coupled to one of the first lens and the second lens and configured to swing the lens coupled thereto in an arcuate path. An optical beam path of the optical beam passed through the second lens is adjustable by operating the rotary motor. The optical beam steering mechanism is configured to either direct the optical beam to the sample stage or direct the light from the sample to the detector.

In yet another aspect, the disclosure provides a method for aligning a beam in an optical instrument. The method comprises powering ON the optical instrument including first and second lenses driven respectively by first and second motors, and further including first and second motor position encoders, wherein the first and second lenses define focal lengths of substantially equal magnitude and opposite polarity, and wherein the second lens is positioned to directly receive the beam passing through the first lens. The method also comprises actuating the first and second motors to respectively move the one or both of the first and second lenses to a calibrated position, wherein the calibrated position corresponds to a desired optical beam path alignment at which the beam passes through the first and second lenses and maintaining power to the first and second motors as long as the optical instrument is powered ON. The method further comprises using feedback from the first and second motor position encoders to maintain the calibrated position as long as the optical instrument is powered ON.

Other aspects of the disclosure will become apparent by consideration of the detailed description and accompanying drawings.

DETAILED DESCRIPTION

Figure 1:
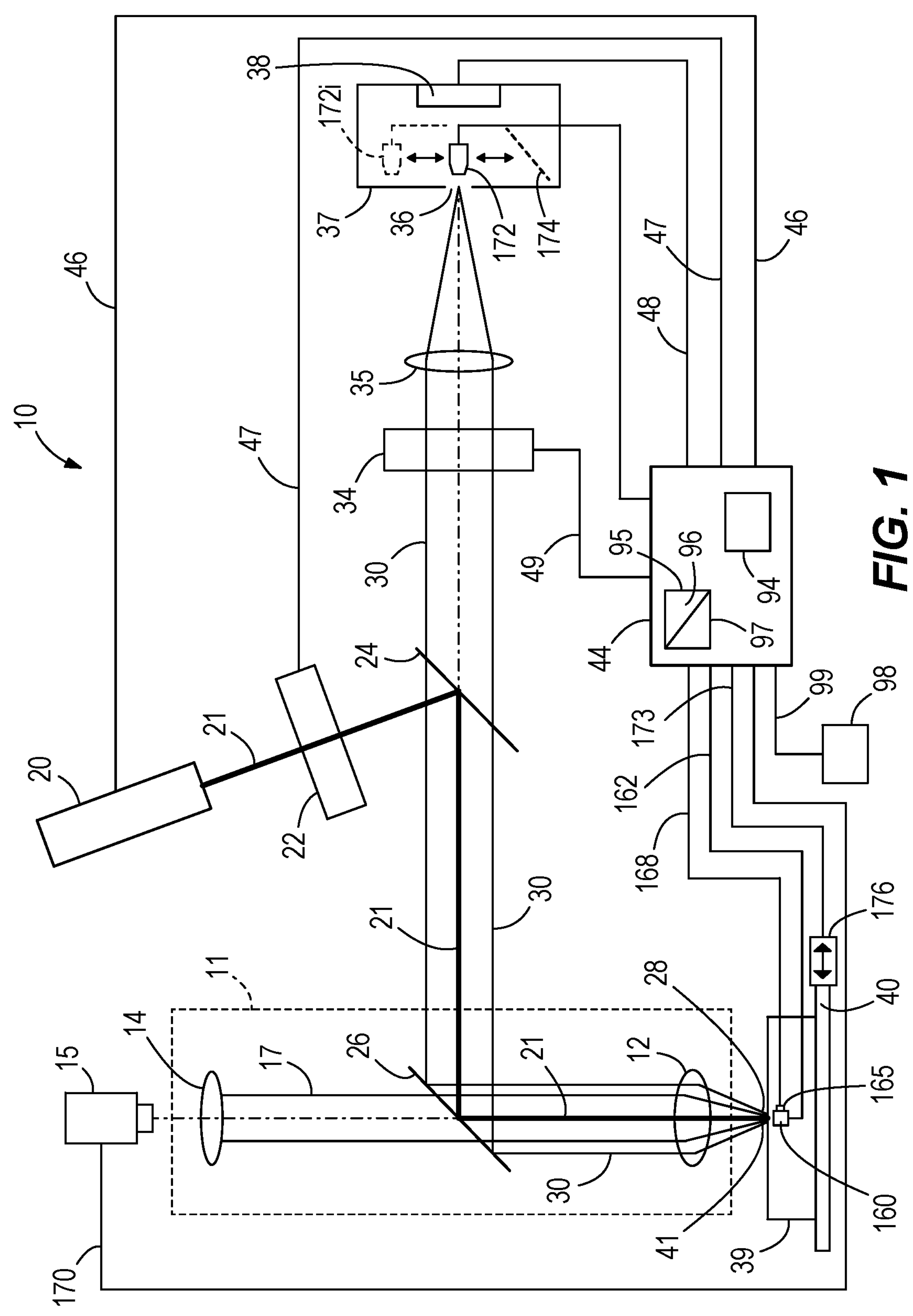
FIG. 1 is a schematic diagram of an optical instrument having a beam path in accordance with the disclosure.

Automatic alignment mechanisms are useful for maintaining the functioning of optical instruments, such as spectroscopic microscopes, infrared photothermal devices, and other optical instruments, against mechanical drift and interchange of optical components. For example, automatic optical alignment mechanisms are useful for maintaining the functioning of spectroscopic microscopes against mechanical drift and interchange of optical components.

In one example, a pair of lenses can be mounted sequentially along an optical axis. Angular deviation may be introduced by translating one of the lenses relative to the other. This arrangement has been discussed in U.S. Pat. No. 6,661,509, which is incorporated herein by reference in its entirety and for all purposes. Applicant recognizes that translating the lens requires a linear motor, which can be bulky and expensive. With limited space in the optical instrument, attaching an encoder to the linear motor can be difficult. Further, during operation of the optical instrument, such as during measurement, the linear motor needs to be powered down to reduce noise and heat, which can affect other optical parts and introduce inaccuracy to the measurement. Therefore, a more compact, stable, reliable, and easily controlled optical setup is needed for aligning the beam in the optical instrument.

In order to address the above issues, a beam steering mechanism, an optical instrument including the beam steering mechanism, and a method for aligning the optical beam are disclosed herein. These offer improved design flexibility and robustness with reductions in size, cost, and complexity. The optical beam steering mechanism includes a first lens defining a first focal length having a first magnitude and a first polarity, and a second lens defining a second focal length having a second magnitude and a second polarity, wherein the first and second magnitudes are substantially equal and the first and second polarities are opposite. That is, the first and second lenses have substantially the same magnification, but one has positive polarity (convex) and the other has negative polarity (concave). The first lens and the second lens are configured to receive an optical beam path therethrough. The second lens directly receives light passes through the first lens. In other words, no optical part is positioned between the first and second lenses. In some examples, the optical beam steering mechanism may include only the first and second lenses, but no other lenses. In one example, the first lens is positioned substantially parallel to the second lens. In one example, the first lens and the second lens are spaced from each other by a distance that is relatively small. The distance may be 5% of the focal length or less, or 1% of the focal length or less, etc.

At least one of the first lens and the second lens may be swung in an arcuate path by operating a rotatory motor coupled to the first lens or the second lens. The arcuate path is substantially parallel to the first or the second lens. By swung one of the lenses, the optical path of the light beam passing through the two lenses is adjusted.

The lenses may be spaced apart from each other by a distance much less than their focal length. The net optical power of the pair of lenses is approximately zero. When the lenses are centered on one another, they produce no net optical effect. When one or both lenses is displaced relative to the optical beam by operating the rotary motor, the net power is substantially unchanged, but the lens deviates the beam by an angle in radians of $\alpha \approx \frac{y}{f}$ where y is the displacement and f is the focal length of the lenses. Because f can be large, e.g., 1000 mm, a large lens displacement can produce a very small amount of angular deviation of the optical beam. The focal length acts as a "lever" to reduce the action of the lens displacement to a small optical beam deviation angle. In this way, the angular deviation of the optical beam can be finely tuned using relatively coarse lens displacement. The focal length may be greater than 100 mm.

Rotary motors are cheaper and occupy less volume than linear motors. Applicant finds that swinging each of the lenses in an arc is surprisingly effective at achieving a comparable level of beam control as beam steering mechanisms that use two-axis linear control to move the lenses independently in x- and y-directions. Such linear beam steering mechanisms require stepping linear actuators and additional mechanical components to constrain the motion of the lenses so that the assembly is robust and repeatable. The bearings of a rotary motor provide sufficient constraint by themselves without needing to add additional components to constrain the motion of the lenses to reproducible paths. The rotary system is also more resistant to vibrations, e.g., retains positional accuracy better than linear motor adjusters. In this way, the alignment of the microscope may be achieved by applying small angular deviations to one or more optical beams via the beam steering mechanism, e.g., on the order of a few milliradians or less. This configuration offers improved design flexibility and robustness with reductions in size, cost, and complexity comparing to translating the lens with linear motor.

In some examples, at least one of the first and second lenses may be coupled with a rotary motor via a shaft extending from the rotary motor and an arm coupled between the shaft and the lens. The arm defines the radius of the arcuate path. The rotary motor may be rotary stepping motors (e.g., with microstep drive) driven at low current. A rotary position encoder may be coupled to the shaft to measure the rotational position of the shaft. As one example, the encoders may provide 16,384 counts per revolution, or 61 micro-radians per count. The lens position may be finely adjusted by operating the rotary motor based on the feedback of the encoder.

In one example, each of the two lenses is coupled with a rotary motor. The first rotary motor may have a first motor shaft extending therefrom, and the second rotary motor may have a second motor shaft extending therefrom. A first rotary position encoder may be used to sense a rotary position of the first motor shaft, and a second rotary position encoder may be used to sense a rotary position of the second motor shaft. A radius may be defined between each motor shaft rotation axis and the respective lens center. A first arm may be operatively coupled to the first motor shaft and configured to hold the first lens, and a second arm may be operatively coupled to the second motor shaft and configured to hold the second lens. The first arm may therefore define the first radius between the portion of the arm that couples to the motor shaft (coinciding with the motor shaft axis) and the portion of the arm that holds the lens (which defines the lens center), and the second arm may define the second radius in the same way. The radii are transverse to one another when the lenses are centered, e.g., disposed having any angle therebetween that is less than 180 degrees. The lenses are centered when the optical axes of the lenses overlap. In one example, the radii may be perpendicular to each other when the lenses are centered on the optical axis. In other examples, the radii may be disposed relative to each other at an angle of 85 to 95 degrees, 80 to 100 degrees, 70 to 110 degrees, 60 to 120 degrees, etc. In one example, a radius of 25 mm is sufficient to separate the body of the motor from the optical axis and results in a deviation of the respective lens of about 1.5 microns per count. With lenses of +1000 and −1000 mm focal length, the resulting angular deviation is 1.5 micro-radians per count. An electronic controller may be configured to receive feedback from the first rotary position encoder and the second rotary position encoder. The electronic controller may further be configured to maintain positions (e.g., a calibrated position) of the first lens and the second lens based on the feedback.

The beam steering mechanism may be included in an optical instrument such as a spectrograph, a microscope, an infrared photothermal device, a combination of these aforementioned instruments, or any other instrument having a source of electromagnetic radiation defining an optical beam path. In some examples, one or more beam steering mechanisms are included in a Raman microscope. For example, the beam steering mechanism may be positioned downstream of the illuminating source to adjust the beam path of the illuminating light. The beam steering mechanism may be positioned upstream of the spectrograph to adjust the path of the beam collected by the spectrograph.

In one example, the optical instrument including a beam steering mechanism that is powered ON while acquiring sample data. That is, the one or more rotary motors are powered ON during data collection. An optical beam path passes through first and second lenses of a beam steering mechanism. The first and second lenses define focal lengths of substantially equal magnitude and opposite polarity. The first and second motors may move one or both of the first and second lenses to a calibrated position before data acquisition. The calibrated position corresponds to a desired optical beam path alignment. Power is maintained to the first and second motors as long as the optical instrument is powered ON. Using feedback from the first and second motor position encoders, the lenses may be maintained at the calibrated position as long as the optical instrument is powered ON. This provides positional reliability throughout the measurement, e.g., against gravity which acts to swing the lenses away from the calibrated position. The first and second motors may be rotary motors, but this method may be employed with other types of motors to provide positional reliability. The calibrated positions of the lenses may be determined through a calibration process performed by the manufacturer or the user, e.g., by way of an actuator configured to trigger a calibration sequence programmed into the controller. The calibrated position, once determined, is stored in the controller. When the instrument is powered OFF, the calibrated position of the lenses may not be maintained, e.g., due to the effects of gravity pulling on the lenses. As such, when the instrument is turned ON, the controller is programmed to return the lenses to their most recent calibrated position. The encoders may facilitate return of the lenses to the calibrated position by finding a zero reference position and then moving to the calibrated position, which is relative to the zero reference position, thus providing positional repeatability. The user may update the calibrated position periodically, after any change in environmental parameters (e.g., temperature), or before measuring the sample in the same working session. The encoders may provide continuous feedback to continue to maintain the lenses at the calibrated position against gravity, vibrations, etc. as long as the instrument is ON.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways.

In this disclosure, "deviation" will refer to angular deviation of a beam, and "displacement" will refer to a lateral displacement of a beam or optic away from the optical axis. "Optical" may refer to some or all of the electromagnetic spectrum. "Optical" may more specifically refer to visible, ultraviolet, and infrared portions of the electromagnetic spectrum in some implementations, and even more specifically may refer to the visible part of the electromagnetic spectrum in yet other implementations.

An optical instrument is shown generally at 10 in FIG. 1. The optical instrument 10 may be a spectroscopic microscope system suited for Raman spectroscopy, but the optical instrument 10 may include other types of optical systems having beam paths, for example, confocal fluorescence microscopes, other photothermal devices, other spectroscopic devices, other types of microscopes, other combinations thereof, etc. The optical instrument 10 includes an optical microscope shown in simplified form within the dashed lines labeled 11 in FIG. 1. The optical microscope 11 includes an objective lens 12 and an ocular lens or lenses 14 which may be utilized for direct viewing by an observer or which may form part of or be in addition to the lenses within a video camera 15. Light from a sample mounted on stage 40 is thus passed back through the objective lens 12 to the ocular lenses 14 on a beam path 17 in a conventional fashion to form an image that can be viewed by the operator either directly or with the use of the video camera 15 and a video display terminal.

In the optical instrument 10 of FIG. 1, illuminating light suited for Raman spectroscopy may be provided from a light source 20, typically a laser, on an illuminating beam path 21 through a beam steering mechanism 22 to a deflecting mirror and notch filter 24 which redirects the illuminating beam path 21 toward a Raman interface module deflecting mirror 26. The deflecting mirror 26 may be formed as a plane mirror or as a dichroic mirror mounted on a motorized slide for selectable insertion into and removal out of the beam path 17. When the deflecting mirror 26 is moved into position in the beam path 17, it deflects the illuminating beam path 21 to become collinear with the microscope optical beam path 17. The objective lens 12 focuses the illuminating beam onto a focal point 28. In other implementations, the optical instrument 10 may include any source of electromagnetic radiation.

The optical instrument 10 also includes a Raman return beam path 30 which includes the scattered light that is collected by the objective lens 12 and formed into a collimated beam which is deflected by the deflecting mirror 26 onto a path collinear with the illuminating beam path 21 up to the position of the notch filter 24. The notch filter 24 is formed to transmit the wavelengths of the Raman radiation in the return beam path 30 and to reflect the wavelengths of the illuminating beam path 21 and of the Rayleigh radiation. The notch filter 24 may be a holographic filter and is used for Rayleigh rejection in the manner described in F. J. Bergin, Spectrochemica Acta, Vol. 46A, No. 2, 1990, pp. 153-159. After passing through the notch filter 24, the Raman radiation in the return beam path 30 passes through a beam steering mechanism 34 and through an input lens 35 which focuses the return beam path 30 towards an input aperture 36 of a spectrograph 37. The spectrograph 37 may be formed to spatially distribute the wavelengths of light in the return beam path 30 which are then incident upon a detector 38 which detects the intensity of the light at the various wavelengths to provide an output signal indicative of the Raman spectrum for a sample.

When the optical instrument 10 is carrying out alignment, a reference sample, such as alignment instrument 39, may be mounted on the stage 40. As explained further below, the alignment instrument 39 includes a spatially limited stage entrance aperture 41 which is positioned by the operator to coincide with the central axis of the beam path 17. A controller 44 (e.g., an electronic controller) provides control signals to and receives signals from the alignment instrument 39 on lines 162, 168. In addition, the controller 44 is connected to the light source 20 by a control line 46, to the beam steering mechanism 22 by a line 47, to the detector 38 by a line 48, and to the beam steering mechanism 34 by a line 49. As discussed further below, the controller 44 can carry out automatic alignment adjustments utilizing the beam steering mechanisms 22, 34 under software control once the operator has positioned the alignment instrument 39 so that the stage entrance aperture 41 is aligned with a focal point of the optical instrument 10.

Figure 2:
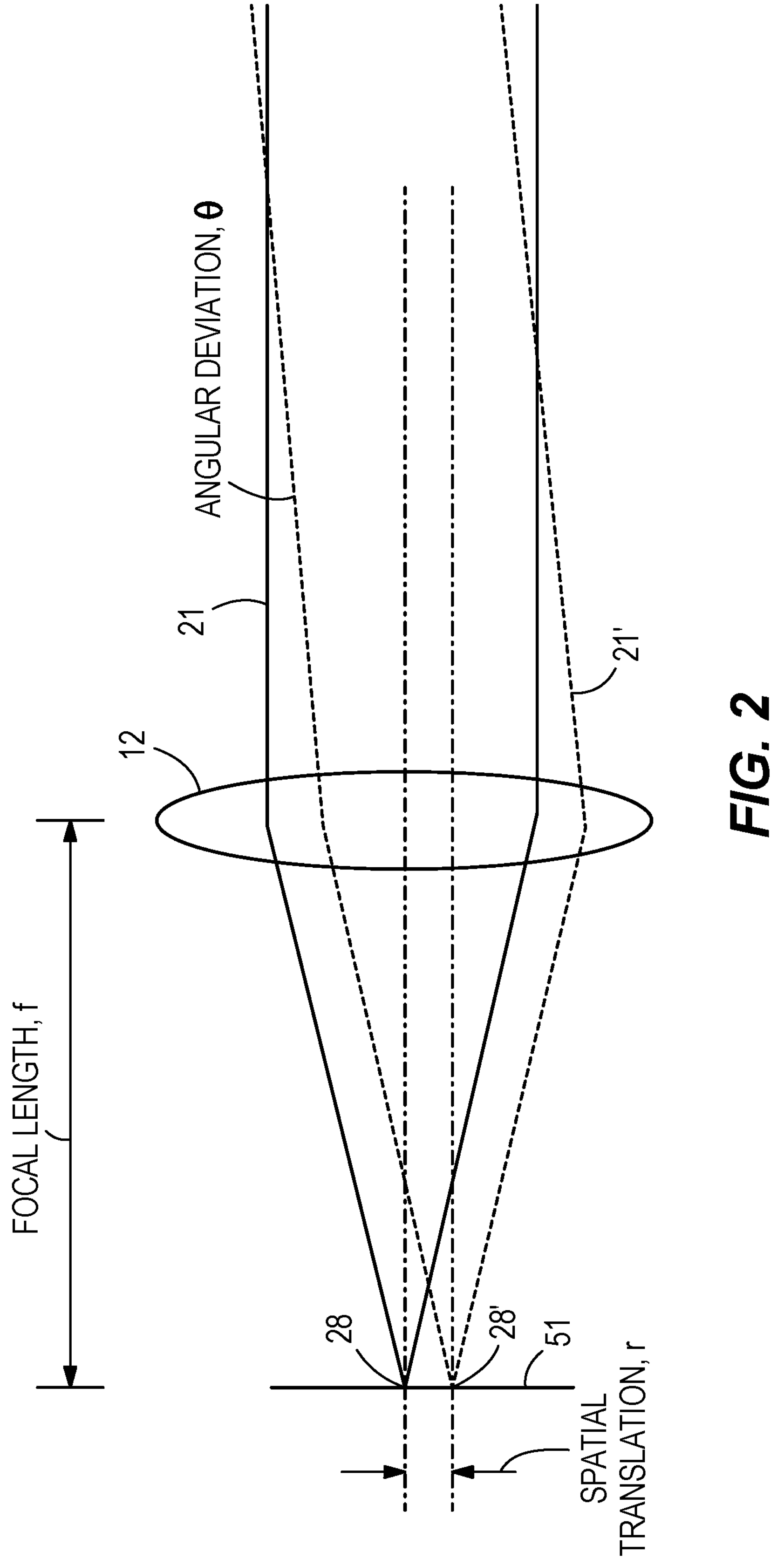
FIG. 2 is a schematic diagram illustrating the effects of misalignment of the beam path in the optical instrument.

The effects of misalignments of the beams within the optical instrument 10 are illustrated in FIG. 2, which shows the illuminating beam path 21 passed through the objective lens 12 and focused to the focal point 28 lying in a focal plane 51 of the microscope 11. Angular deviations (see 21') in the collimated portion of the illuminating beam path 21 are transformed into spatial translations r (see 28') at the focal plane in accordance with: $r=f\theta$ where r=spatial translation away from the center of the optical axis, f=focal length of the lens, and θ=the angular deviation of the beam. For example, the focal length of a 100× objective lens 12 is 1.6 mm, a 50× is 3.2 mm, and a 20× is 8 mm. As one example, a typical focal length for the spectrograph input is 40 mm.

The beam steering mechanisms 22, 34 are provided in order to precisely align the illuminating beam path 21 with the focal point 28 and the return beam path 30 with the spectrograph entrance aperture 36. The beam steering mechanisms 22, 34 may be disposed anywhere in any of the beam paths disclosed herein, or in any other beam path of an optical beam in any device. The beam steering mechanisms 22, 34 are fed adjustment signals by the controller 44, which respectively receives input from the detector 38 (as discussed below) and from the alignment instrument 39 situated on or within the sample stage 40 of the microscope 11. The alignment instrument 39 includes the stage entrance aperture 41 which is positioned by the operator, by viewing the alignment instrument 39 with the ocular optical element 14 and/or video camera 15, to coincide with the central axis of the microscope optical beam path 17. The alignment instrument 39 includes with its interior a stage light source 160, e.g., a high intensity light emitting diode (LED), actuated by line 162 communicating with the controller 44, and a stage light sensor 165, e.g., a silicon photodiode situated to receive light transmitted through the LED/stage light source 160, with the stage light sensor 165 emitting a stage light sensor output signal to the controller 44 along line 168 in response to receipt of light. In one example, the controller 44 performs alignment by turning on the stage light source 160 and then controlling the beam steering mechanism 34 until the return beam path 30 from the stage light source 160 registers with maximum intensity on the detector 38, thereby indicating that such a return beam path 30 would also be well-aligned with the spectrograph entrance aperture 36 and the detector 38 if the return beam path 30 was generated via the illuminating light beam path 21 from the light source 20. Similarly, the beam steering mechanism 22 can be controlled by the controller 44 until the stage light sensor 165 measures maximum output from the light source 20, indicating that the illuminating beam path 21 is properly aligned. In other words, the input or datum beam for spectrometry is optimized via the beam steering mechanism 22 by signals from the stage light sensor 165 in the alignment instrument 39 (with the stage light sensor 165 being stimulated by the light source 20), and the return beam path 30 for spectrometry is optimized via the beam steering mechanism 34 by signals from the detector 38 in the spectrograph 37 (with the detector 38 being stimulated by the stage light source 160). Note that the controller 44 communicates with the light source 20 by line 46, with the beam steering mechanism 22 by line 47, with the detector 38 by line 48, and with the beam steering mechanism 34 by line 49, as well as with the stage light sensor 165 via line 168 and the stage light source 160 via line 162. Once alignment is achieved, the alignment instrument 39 may be removed from the sample stage 40 (if not built therein) so that the microscope 11 may be used for analyzing samples. The current position of the beam steering mechanisms 22 and 34 may be set as calibrated position and stored in the non-transitory memory of the controller. It should be understood that a "line" may be embodied as a wired or a wireless connection.

In another example, which may be performed separately or in conjunction with the above alignment method, alignment of the microscope beam path 17 is performed by having the viewer light sensor 15 receive the microscope alignment light signal from the optical elements 12, 26, and 14 and generate a corresponding output signal from the viewer light sensor 15. The output signal from the viewer light sensor 15 is then supplied (e.g., via line 170) to the controller 44, which can reposition the stage light source 160 (or more generally the alignment instrument 39) in response to the output signal from the viewer light sensor 15. As an example, if the viewer light sensor 15 is provided in the form of a video camera, the controller 44 can utilize the pixel values captured by the camera 15, and can supply instructions to move the alignment instrument 39 so that the greatest/brightest pixel values are centered within the pixel array (i.e., so that the stage light source 160 is aligned with the central viewing axis of the viewer light sensor/video camera 15). Moving the alignment instrument 39 may be achieved by use of suitable actuators 176 configured to be controlled by the controller 44 (e.g., via line 173).

The spectrograph 37 further includes a return light source 172 which is positionable in line with the spectrograph entrance aperture 36 and the optical elements 35, 24 and 26, and which may be actuated to emit a spectrometer alignment light signal through the spectrograph entrance aperture 36. The optical elements 35, 24, 26 and 12 may then deliver the alignment light signal to the alignment instrument 39. The stage light sensor 165 in turn emits an output signal in response to any spectrometer alignment light signal received through the stage entrance aperture 41. The output signal from the stage light sensor 165 can then be supplied to the controller 44 (as by line 168), which may reposition the stage light sensor 165 (and/or adjust the beam steering mechanism 34) to maximize the output signal from the stage light sensor 165, thereby indicating that the return beam 30 has achieved suitable alignment. It is notable that while this arrangement may seem duplicative of the alignment achieved by the use of the stage light source 160 and detector 38, alignment by use of the return light source 172 and stage light sensor 165 can be advantageous in that the return light source 172 emits an "ideal" alignment signal: the signal is emitted from the spectrograph entrance aperture 36, which has a fixed position (unlike the movable position of the stage entrance aperture 41), and the alignment light signal is projected from the spectrograph entrance aperture 36 onto the alignment instrument 39. The spot from the alignment light signal can then be coarsely aligned with the stage entrance aperture 41 (and the stage light sensor 165) by user visualization, and fine alignment can occur between the spectrograph entrance aperture 36 and the stage light sensor 165 by having the controller 44 reposition the alignment instrument 39 to attain signal maximization.

Within the spectrograph 37, the return light source 172 is preferably movable between an emission position wherein the return light source 172 emits the spectrometer alignment light signal through the spectrograph entrance aperture 36 and to the optical elements, and an inactive position (shown in phantom at 172*i*) wherein the return light source 172 does not emit the spectrometer alignment light signal through the spectrograph entrance aperture 36. This allows the spectrograph 37 to be used for ordinary purposes (i.e., to receive light into the spectrograph entrance aperture 36 for delivery to the detector 38), or to emit the spectrometer alignment light signal from the spectrograph entrance aperture 36 for delivery to the stage light sensor 165. As an alternative to moving the return light source 172, a movable reflector 174 could be provided which receives the spectrometer alignment light signal and redirects it through the spectrograph entrance aperture 36 and to the optical elements, with the reflector 174 being movable between an inactive position (at the position of the reflector 174 shown in FIG. 1) and an emission position (at the position occupied by the return light source 172 in FIG. 1).

Further details regarding the alignment method using the elements illustrated in FIG. 1 are disclosed in U.S. Pat. Nos. 6,661,509 and 7,460,229, the entire contents of both of which are incorporated herein by reference.

Figure 3:
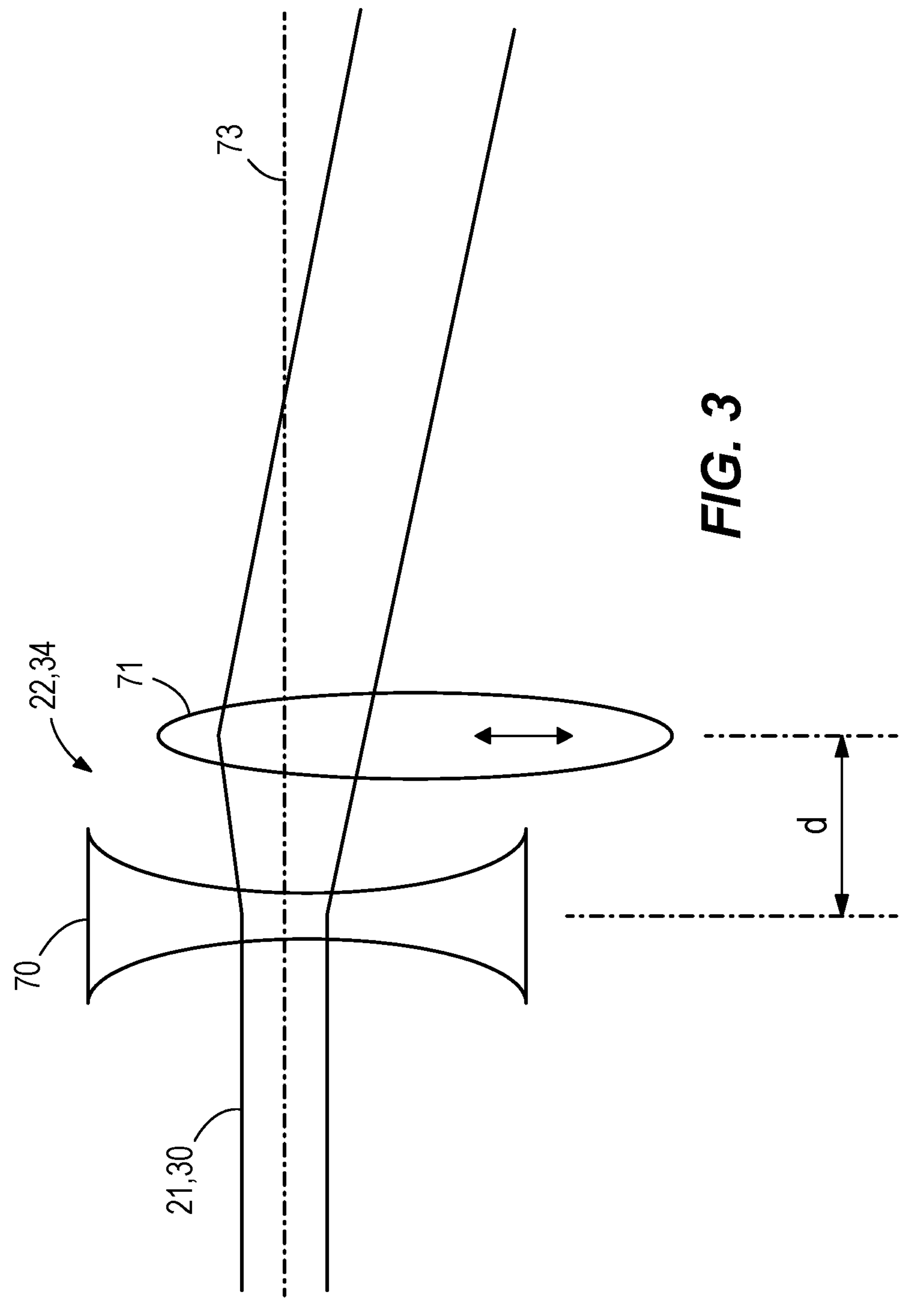
FIG. 3 is a schematic diagram of a pair of lenses that may be utilized to adjust the beam path in the optical instrument.

An arrangement for each of the beam steering mechanisms 22 and 34 for adjusting the beams 21 and 30 is shown schematically in FIG. 3. The beam steering mechanisms 22, 34 have substantially the same configuration as each other and differ only in their placement within the optical instrument 10, so any description of one of the beam steering mechanisms 22, 34 applies equally to the other and need not be repeated. Each beam steering mechanism 22, 34 comprises a pair of lenses 70 and 71 which is mounted sequentially (in the beam path 21 or 30). One or both of the lenses 70 and 71 (e.g., the lens 71 as shown in FIG. 2) is mounted for movement in a plane perpendicular to an optical axis 73 (e.g., a central axis) of the incoming beam 21 or 30. There is no other optical part positioned between lenses 70 and 71.

FIG. 3 schematically shows the pair of lenses 70, 71 being used to deviate an optical beam. The optical beam is passed through the pair of lenses 70, 71 whose focal lengths f1, f2 (respectively) are of substantially equal magnitude but opposite polarity and are spaced from each other by a distance d much less than the focal length (e.g., "much less" may mean that the distance d is 5, % of the focal length or less, or may mean that the distance d is 1% of the focal length or less, etc., such that the overall power 1/f is insubstantial to the use of the alignment device). Any suitable focal length magnitude may be employed. "Substantially equal magnitude" means so close to each other in magnitude as to have zero net optical power, or near zero net optical power, as given by the "compound lens formula" explained herein. As one example, the focal length of the first lens 70 may be +1000 and the focal length of the second lens 71 may be −1000 mm. The distance d may be 50 mm or less in this example. For example, the distance d may be 10 mm. The net optical power of the pair of lenses 70, 71 is roughly $P \approx 1/f + 1/(-f)$ which is zero or approximately zero. When these lenses are centered on one another, they produce essentially no net optical effect. When one lens is displaced relative to the optical beam 21, 30, the net power is substantially unchanged, but the lens deviates the beam 21, 30 by an angle $\alpha$ in radians of $\alpha \approx y/f$ where y is the displacement and f is the focal length of the lenses 70, 71. Because f can be large, e.g., 1000 mm, a large displacement can produce a very small amount of deviation. The focal length acts as a "lever" to reduce the action of the displacement to a small angle.

The "compound lens formula" gives the total power 1/f of the lens pair. When two thin lenses are separated in air by the distance d, the focal length for the combined system is given by $$\frac{1}{f} = \frac{1}{f_1} + \frac{1}{f_2} - \frac{d}{f_1 f_2}.$$

Because d is considerably smaller than f1 and f2, the contribution of the third term is nearly zero. Because the lenses have opposite focal lengths, the first two terms add up to zero or nearly zero as well. Thus, the lens pair has substantially no net optical power.

Figure 5:
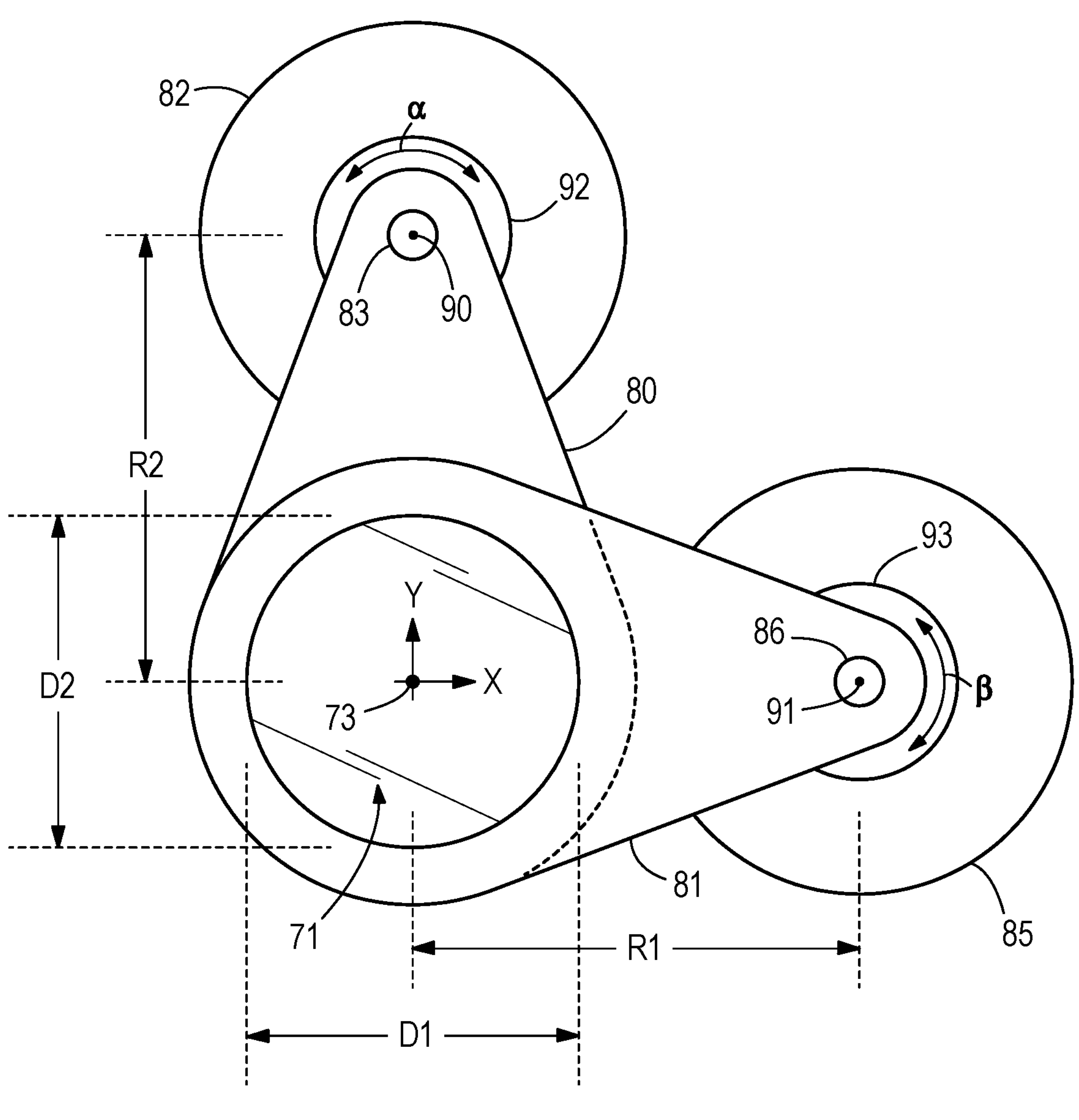
FIG. 5 is an orthogonal view of the beam steering mechanism of FIG. 4.

As best illustrated in FIG. 5, each lens 70, 71 has a respective diameter D1, D2 of about 25 mm in the illustrated implementation. In some implementations, the diameter D1, D2 may be 10 mm to 100 mm, or more specifically 15 mm to 50 mm, or even more specifically 20 mm to 30 mm. However, the diameter D1, D2 may have any desired value depending on the application.

Figure 4:
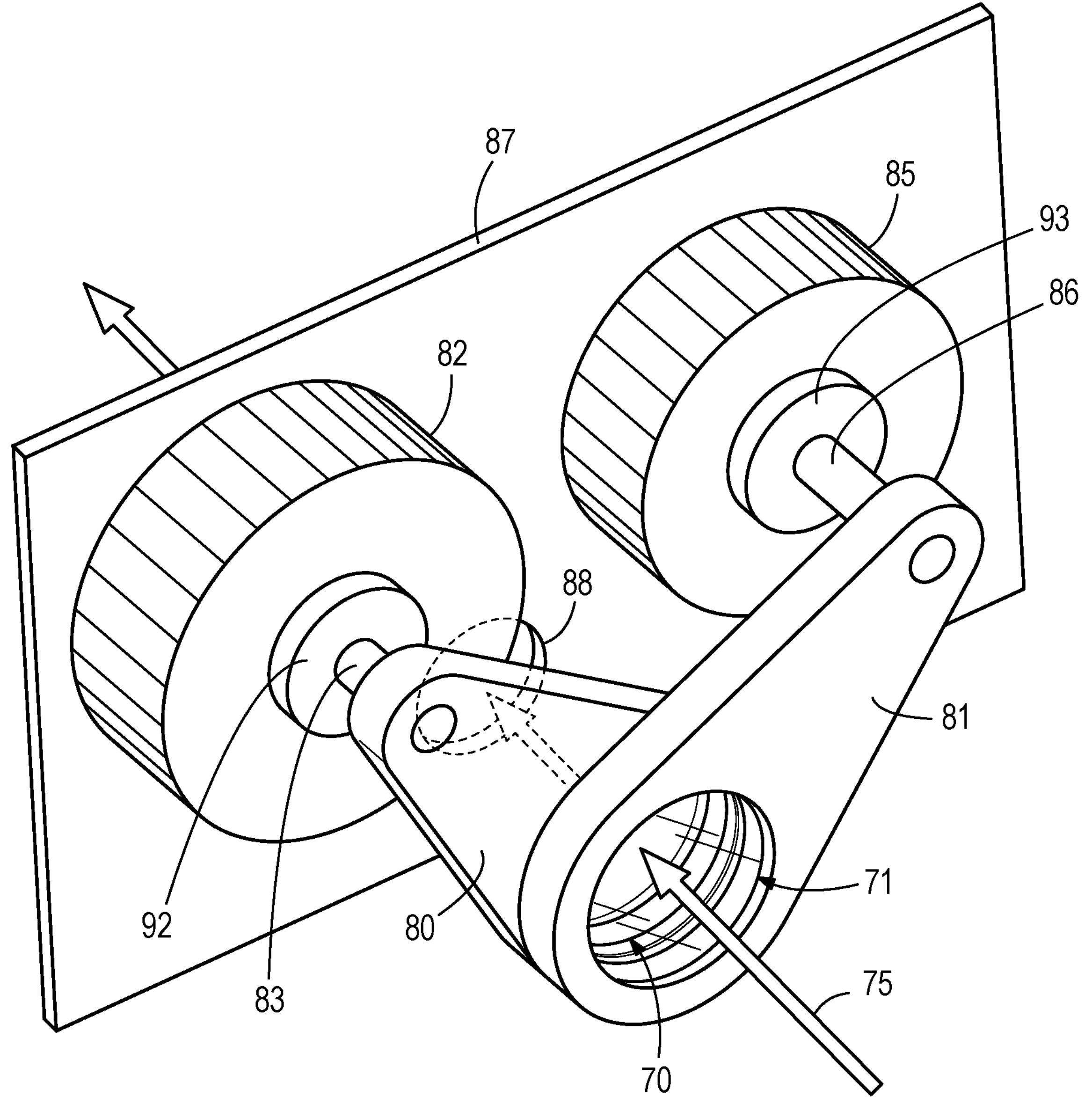
FIG. 4 is a perspective view of a beam steering mechanism for use in the optical instrument of FIG. 1.

In the illustrated implementation, as shown in FIGS. 4-5, the first lens 70 may be mounted on a first arm 80 which is directly driven by a first motor 82 (e.g., a rotary motor) to control the position of the lens 70 in an X-Y plane. The second lens 71 may be mounted on a second arm 81 which is directly driven by a second motor 85 (e.g., a rotary motor) to control the position of the lens 71 in the X-Y plane. "Directly driven" may also include the use of a shafted encoder or other type of encoder (which will be described in greater detail below) disposed between the motor 82, 85 and the arm 80, 81. Each motor 82, 85 causes the respective lens 70, 71 to swing in an arc ($\alpha$ and $\beta$ respectively). A respective radius R1, R2 of each arc is large enough such that swinging each respective lens 70, 71 provides an approximation of linear movement in the respective X and Y directions with the effect of the arc being relatively small, i.e., in an arcuate path having a radius R that is relatively large as is explained mathematically in greater detail below. At the very least, R must be greater than the physical radii of the motors, so that the motors do not occlude the beams. In a preferred arrangement, R is roughly 10× the diameter of the laser beams, which minimizes coupling between the two axes of motion and maintains sufficient clearance of the beam through both lenses. The radii R1, R2 are transverse to one another when the lenses 70, 71 are centered on the optical axis 73, e.g., disposed having any angle therebetween that is less than 180 degrees. In the illustrated implementation, the radii R1, R2 are perpendicular to each other when the lenses 70, 71 are centered on the optical axis 73. In other examples, the radii R1, R2 may be disposed at an angle of 85 to 95 degrees, 80 to 100 degrees, 70 to 110 degrees, 60 to 120 degrees, 45 to 135 degrees, etc.

FIG. 5 illustrates motion of the lenses 70, 71. The motors 82, 85 swing by angles $\alpha$ and $\beta$ and, and a pivot axis 90, 91 of each of the motors 82, 85 is respectively a distance R1, R2 from the optical axis 73. The centers of the lenses 70, 71 are deviated by amounts $$y \approx R(\sin\beta + \cos\alpha - 1)$$

$$x \approx R(\sin\alpha + \cos\beta - 1).$$

Given the approximations $\sin x \approx x$ and $\cos x \approx 1$, the mechanism provides nearly orthogonal coordinate axes x and y when the angles are small:

$$y \approx R\beta$$

$$x \approx R\alpha.$$

As illustrated in FIG. 4, the first and second motors 85, 82 are mounted to a base 87. The arms 80, 81 are attached respectively to shafts 83, 86 of the motors 82, 85. There is sufficient clearance between the motors 82, 85 so that the arms 80, 81 do not collide with the shafts 83, 86, and the beam is not occluded by either motor 82, 85. The base 87 includes an aperture 88 through which the beam may pass such that the base 87 does not occlude the beam.

The lens 70 may be mounted directly to the arm 80 which may be mounted directly to the motor 82, and the lens 71 may be mounted directly to the arm 81 which may be mounted directly to the motor 85. Both motors 82, 85 may be supplied with power by way of the controller 44 to drive the lenses 70, 71 to a desired position. The motors 82, 85 are preferably operated independently from each other so that new measurements can be made at each step, e.g., in a raster pattern. In the illustrated implementation (see FIG. 4), a position encoder 92, 93 (e.g., a position sensor) may be coupled to each motor 82, 85, respectively. The position encoders 92, 93 provide feedback signals to the controller 44 corresponding to rotational positions of the respective motor shafts 83, 86. The feedback signals may travel along lines 47, 49 (FIG. 1). Feedback from the encoders 92, 93 may be used by the controller 44 to control the motors 82, 85 maintain a desired position of the lenses 70, 71. The encoders 92, 93 may be configured to provide absolute or incremental feedback signals of any desired resolution. The encoders may have any suitable configuration, e.g., shafted, hollow shaft, ring-mount, etc. The encoders may sense the position optically, magnetically, or using any other suitable principle. In one example, the motors 82, 85 are rotary stepping motors (e.g., with microstep drive) driven at low current with the encoders 92, 93 (e.g., rotary position encoders) coupled thereto to provide closed-loop feedback. As one example, the encoders 92, 93 may provide 16,384 counts per revolution, or 61 micro-radians per count. However, encoders resolutions of 10 to 250 micro-radians per count are readily available and could be employed if they satisfy the requirements of the application. In one example, the radius R1, R2 of 25 mm is sufficient to separate the body of the motor 82, 85 from the optical axis 73, and results in a deviation of the lens 70, 71, of about 1.5 microns per count. With lenses 70, 71 of +1000 and −1000 mm focal length, the resulting angular deviation is 1.5 micro-radians per count. The example also holds if the lenses are swapped, e.g., −1000 and +1000 mm. Ray trace modeling has shown that this focal length is sufficient to avoid adding an unacceptable level of aberration to the beam when the lenses 70, 71 are decentered. In one example, a Raman microscope might preferably have an objective lens 12 with a focal length of 1.8 mm and numerical aperture of 0.9 (commercial "100×" objective), and at visible wavelengths, achieve a spatial resolution of roughly 0.3 microns. This spatial resolution corresponds to a deviation of about 170 micro-radians.

With a resolution of 1.5 micro-radians, it is possible for the beam steering mechanisms 22, 34 to precisely "find" the center of a spot that is 170 micro-radians wide in angular terms. At the same time, lenses 70, 71 with 25 mm clear aperture will allow control of a 5 mm diameter beam with an overall angular range of 20 milli-radians, which has been found to be sufficient for covering mechanical tolerances between multiple optical assemblies when these are interchanged within a system. Thus the system has both sufficient resolution and range to 1) correct for mis-alignment that occurs during the storage and use of the instrument, for instance due to thermal drift, mechanical creepage and so forth, and 2) to correct for variations in the alignment of other components in the system, for instance when a component is replaced with another.

By displacing one or both of the lenses 70, 71 from the optical axis 73 of input light beam 75, an angular deviation is provided to the beam passing through it. Such a mechanism allows significant mechanical advantage, allowing the use of a motor drive that has relatively coarse mechanical resolution. Thus, the deviation angle $\alpha$ can be controlled using arcuate lens movement.

The controller 44 may include a programmable processor 94 (e.g., a microprocessor, a microcontroller, or another suitable programmable device) and a memory 95 such as a non-transitory memory. The memory 95 may include, for example, a program storage area 96 and a data storage area 97. The program storage area 96 and the data storage area 97 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The controller 44 may also, or alternatively, include integrated circuits and/or analog devices, e.g., transistors, comparators, operational amplifiers, etc., to execute the functionality described herein.

As one example, the controller 44 may be configured to adjust positions of the lenses 70, 71. The controller 44 may perform adjustment, or calibration, automatically in response to an input signal and cease adjustment when a desired position is found. The input signal may communicate with the controller 44 to initiate control of one or both of the motors 82, 85 and perform the calibration adjustment based on feedback. The input signal may be sent to align the beam as part of the manufacturing process and/or may be sent by an operator in the field. The input signal may be sent by way of an actuator 98 (FIG. 1) or automatically by an algorithm programmed into the controller 44 (e.g., programmed to periodically initiate calibration). In one example, the actuator 98 is provided to initiate calibration of one or both beam steering mechanisms 22, 34 via control line 99. In other examples, separate actuators may be provided for each of the beam steering mechanisms 22, 34. The actuator 98 may be any type of actuator capable of receiving human input, such as a button, a touch screen, a voice command receiver, etc. The actuator 98 may be physically disposed on the optical instrument 10 or located remote from the optical instrument 10. For example, a remote actuator 98 may include an app or program on a smartphone, tablet, computer, or other device that is wirelessly in communication with the optical instrument 10.

Figure 6:
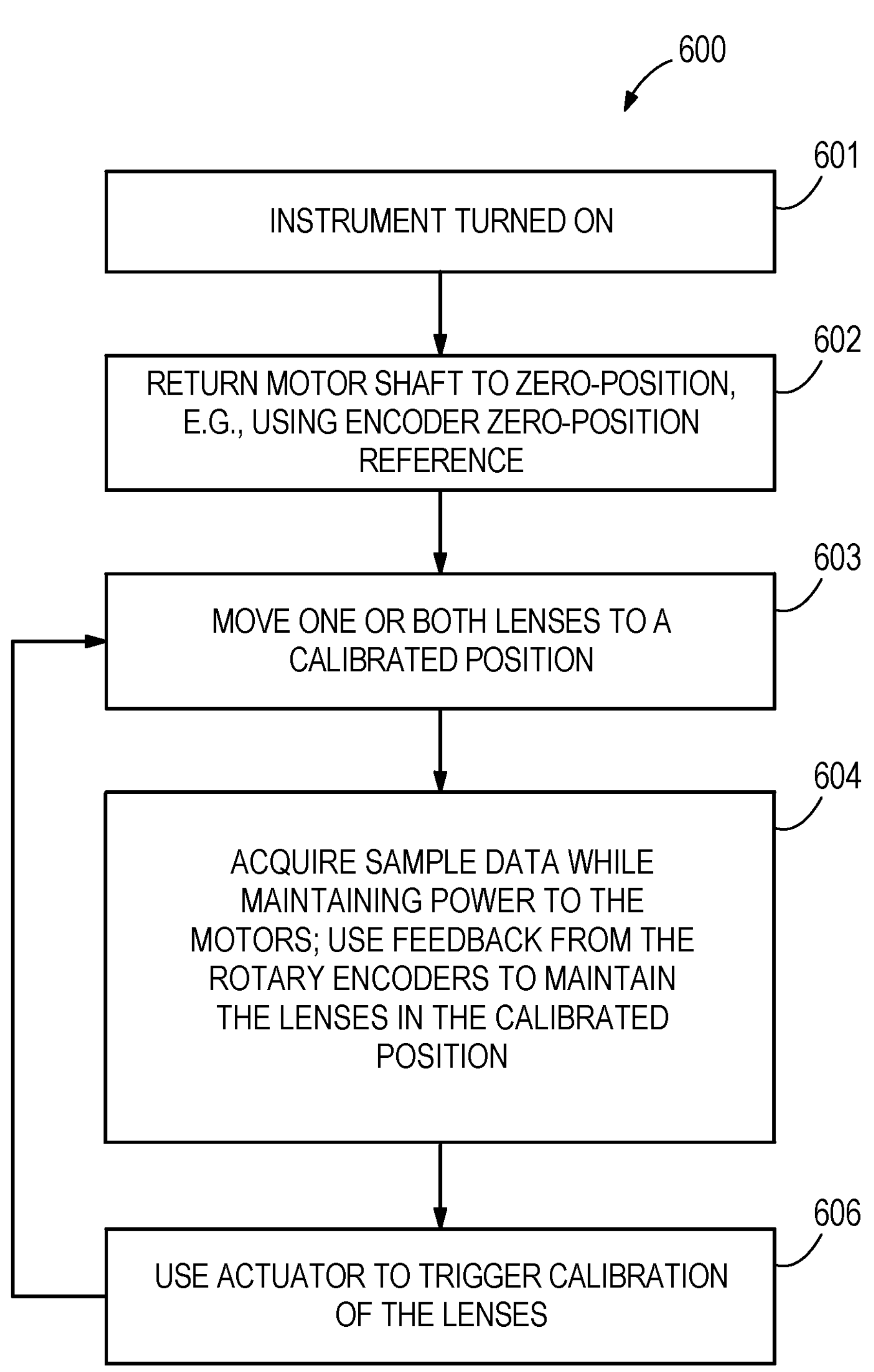
FIG. 6 is a method flow chart in accordance with the present disclosure.

In operation, the beam steering mechanism 22, 34 is used to align one or more optical beams of the optical instrument. FIG. 6 illustrates a flow chart for a method 600 of operating the optical instrument 10 and aligning the optical instrument before sample measurement. The method 600 may include any one or more of steps 601-606, amongst other additional and intermediary steps apparent from the disclosure, in any combination. At step 601, the optical instrument 10 is turned ON and begins to receive power. The one or more rotary motors receive power and are actuated. At least steps 602-605 may involve use of the controller 44, e.g., to automatically execute the steps. At step 602, each respective motor shaft 83, 86 is moved to a zero position upon power-up of the optical instrument 10. The zero position may be found using the encoders 92, 93 which each have a zero-position reference that returns each respective motor shaft 83, 86 to the zero-position. In the preferred embodiment the motors are moved to a calibrated position (such as an "index" position on the encoder itself) and then moved to a "zero" position, which may be a stored distance away from the index position. The index position is a feature of the encoder itself. The zero position is acceptably close to the position where the angular deviation of the optical beam is zero. The index position and the zero position may be slightly different due to assembly variation, such as, for example, when a lens is not attached to a shaft in exactly the right location. The index position, however, is repeatable, and, thus, it is trustworthy to find the index position first and then travel known number of steps to the zero position. Other means for determining a zero-position are possible, e.g., using optical limit switches, over-driving the arms 80, 81 against a stop, etc.

At 602, the method optional includes providing the actuator 98 configured to trigger calibration or alignment of one or both of the first and second lenses 70, 71. For alignment, an alignment instrument (such as alignment instrument 39 in FIG. 1) may be loaded to the optical instrument. The actuator 98 may be actuated by the manufacturer or the user at any time as long as the optical instrument 10 is ON. Calibration includes using the controller 44 to determine the desired optical beam path alignment, e.g., as discussed in greater detail above, and storing a corresponding calibrated position in the controller 44, e.g., when drift or swapping of optical components cause changes in the beam path. This new calibrated position may become the most recent calibrated position such that, if the optical instrument 10 is shut down, this new calibrated position is returned to when the optical instrument 10 is powered up (see step 601).

At step 603, one or both lenses 70, 71 is moved to a calibrated position by moving the respective motor shaft 83, 86 to the calibrated shaft position relative to the zero position reference. Moving may include swinging one or both lenses 70, 71 in an arc. In one example, the calibrated positions of the motors 82, 85 are stored in the controller 44, and the controller 44 is configured to return the motors 82, 85 to their calibrated positions at power-up. In another example, the calibrated positions are obtained at 602. The calibrated position may be a desired position or optimal position recorded during calibration/alignment that is advantageous for a particular application, e.g., a position in which the beam is at a desired location at a particular moment in time (i.e., when the calibration occurs). Calibration and alignment may be used synonymously herein. The calibrated position may be initially determined in a manufacturing setting (before the instrument is sent to the customer) and/or may be determined during use of the instrument by the operator performing calibration, e.g., after components have been swapped, drift has occurred, etc. Calibration may be initiated by using the actuator 98. As such, multiple calibrated positions are possible and may be stored in the controller 44. The most recent calibrated position stored in the controller 44 may be used to position the lenses 70, 71.

At step 604, sample is loaded into the optical instrument and measurements or images are collected from the sample. The sample data are acquired while the power is maintained to the motors 82, 85 as long as the optical instrument 10 is ON. Maintaining continuous power to the motors 82, 85 allows for positional reliability for maintaining the calibrated position of the lenses 70, 71. Gravity may tend to pull on the arms 80, 81 and move the respective motor shaft 83, 86 out of its calibrated position. So, maintaining power to the motors 82, 85 counteracts the effects of gravity to maintain positional reliability. Feedbacks from the rotary encoders 92, 93 are used to maintain the position of the lenses 70, 71 in the calibrated position. Encoder feedback may be used continuously as long as the optical instrument 10 is powered ON. Using the rotary encoders 92, 93 reduces the current required to maintain the calibrated positions as long as the optical instrument 10 is ON, which in turn reduces heat.

At step 606, the method checks whether another sample needs to be measured. If the answer is YES, another sample is loaded and measured at 604. Otherwise, the optical instrument may be powered down at 607.

Further method steps, subsequent or intermediary, in the method 600 may be apparent from the above disclosure. For example, additional method steps may include using any of the components of the optical instrument 10 described herein and using any functionality of the controller 44 described herein.

Thus, the disclosure provides, among other things, a beam steering mechanism 22, 34, and an optical instrument 10 having the beam steering mechanism 22, 34. The disclosure also provides a method for aligning a beam in an optical instrument 10. Various features and advantages of the disclosure are set forth in the following clauses and claims.

Clause 1. An optical beam steering mechanism, comprising: a first lens defining a first focal length having a first magnitude and a first polarity; a second lens defining a second focal length having a second magnitude and a second polarity, wherein the first and second magnitudes are substantially equal and the first and second polarities are opposite, and wherein the second lens is positioned to directly receive an optical beam passing through the first lens; and at least one rotary motor coupled to one of the first lens and the second lens and configured to swing the lens coupled thereto in an arcuate path, wherein an optical beam path of the optical beam passed through the second lens is adjustable by operating the rotary motor.

Clause 2. The optical beam steering mechanism of clause 1, wherein the first lens and the second lens are positioned substantially parallel to each other, and the arcuate path is in a plane substantially parallel to the first lens and the second lens.

Clause 3. The optical beam steering mechanism of any of clauses 1-2, wherein at least one rotary motor coupled to one of the first lens and the second lens includes a first rotary motor coupled to the first lens and a second rotary motor coupled to the second lens.

Clause 4. The optical beam steering mechanism of clause 3, wherein the first lens is swung about a first rotation axis by the first rotary motor, the second lens is swung about a second, different rotation axis by the second rotary motor, the first rotation axis parallel to the second rotation axis.

Clause 5. The optical beam steering mechanism of clause 3, further comprising: a first motor shaft extending from the first rotary motor; a second motor shaft extending from the second rotary motor; a first rotary position encoder configured to sense a rotary position of the first motor shaft; and a second rotary position encoder configured to sense a rotary position of the second motor shaft.

Clause 6. The optical beam steering mechanism of clause 5, further comprising: an electronic controller configured to receive feedback from the first rotary position encoder and the second rotary position encoder, wherein the electronic controller is further configured to adjust positions of the first lens and the second lens based on the feedback.

Clause 7. The optical beam steering mechanism of clause 3, further comprising: a first arm operatively coupled to the first motor and configured to hold the first lens, the first arm defining a first radius from a first rotation axis of the first rotary motor to a center of the first lens; and a second arm operatively coupled to the second motor and configured to hold the second lens, the second arm defining a second radius from a second rotation axis of the second rotary motor to a center of the second lens.

Clause 8. The optical beam steering mechanism of clause 7, wherein the first and second radii are substantially perpendicular to each other when the first and second lenses are centered.

Clause 9. The optical beam steering mechanism of clause 7, wherein the first and second radii are 45 to 135 degrees from each other when the first and second lenses are centered.

Clause 10. The optical beam steering mechanism of any of clauses 1-9, wherein the first lens and the second lens are spaced from each other by a distance, wherein the distance is 5% of the first magnitude or less.

Clause 11. An optical instrument comprising: a source of electromagnetic radiation generating an optical beam; a sample stage for holding a sample; a detector for receiving light from the sample; and at least one optical beam steering mechanism of clause 1, wherein the optical beam steering mechanism is configured to either direct the optical beam to the sample stage or direct the light from the sample to the detector.

Clause 12. The optical instrument of clause 11, wherein the detector is a spectrograph, and the source of electromagnetic radiation is configured to emit an illuminating light suited for Raman spectroscopy.

Clause 13. The optical instrument of any of clauses 11-12, wherein the optical beam steering mechanism includes a first rotary motor coupled to the first lens, a second rotary motor coupled to the second lens, a first rotary position encoder coupled to the first rotary motor, a second rotary position encoder coupled to the second rotary motor, and the optical instrument further comprising: an electronic controller configured to receive feedback from the first rotary position encoder and the second rotary position encoder, wherein the electronic controller is further configured to maintain positions of the first lens and the second lens relative to the optical beam based on the feedback as long as the optical instrument is powered ON.

Clause 14. The optical instrument of clause 13, wherein the electronic controller is further configured to operate the first rotary motor and the second rotary motor to align either the optical beam with respect to the sample or the light from the sample with respect to a spectrograph, and store positions of the first and second rotary position encoders which corresponds to calibrated positions of the first lens and the second lens.

Clause 15. The optical instrument of clause 14, wherein the electronic controller is further configured to continuously supplying electrical power to the rotary motor to maintain the first lens and the second lens at the calibrated positions while sample data is acquired by the optical instrument.

Clause 16. The optical instrument of any of clauses 11-15, wherein the at least one optical beam steering mechanism configured to either direct the optical beam to the sample stage or direct the light from the sample to the detector includes, a first optical beam steering mechanism configured to direct the optical beam to the sample stage, and a second optical beam steering mechanism configured to direct the light from the sample to the detector.

Clause 17. A method for aligning a beam in an optical instrument, the method comprising: powering ON the optical instrument including first and second lenses driven respectively by first and second motors, and further including first and second motor position encoders, wherein the first and second lenses define focal lengths of substantially equal magnitude and opposite polarity, and wherein the second lens is positioned to directly receive the beam passing through the first lens; actuating the first and second motors to respectively move the one or both of the first and second lenses to a calibrated position, wherein the calibrated position corresponds to a desired optical beam path alignment at which the beam passes through the first and second lenses; maintaining power to the first and second motors as long as the optical instrument is powered ON; and using feedback from the first and second motor position encoders to maintain the calibrated position as long as the optical instrument is powered ON.

Clause 18. The method of clause 17, wherein the first and second motors are rotary motors, and wherein moving the one or both of the first and second lenses to the calibrated position includes actuating one or both of the first and second rotary motors to swing the one or both of the first and second lenses along their respective arcuate paths.

Clause 19. The method of any of clauses 17-18, wherein powering ON the optical instrument includes powering ON a spectrographic microscope.

Clause 20. The method of any of clauses 17-19, further comprising determining the calibrated position by imaging a reference sample while adjusting one or both of the motors and storing the calibrated position.

What is claimed is:

1. An optical beam steering mechanism, comprising:

a first lens defining a first focal length having a first magnitude and a first polarity;

a second lens defining a second focal length having a second magnitude and a second polarity, wherein the first and second magnitudes are substantially equal and the first and second polarities are opposite, and wherein the second lens is positioned to directly receive an optical beam passing through the first lens; and a first rotary motor coupled to the first lens;

a second rotary motor coupled to the second lens;

wherein the first rotary motor and the second rotary motor are configured to swing the lenses coupled thereto in an arcuate path, wherein an optical beam path of the optical beam passed through the second lens is adjustable by operating the first rotary motor and the second rotary motor, wherein the first lens is swung about a first rotation axis by the first rotary motor, the second lens is swung about a second, different rotation axis by the second rotary motor, the first rotation axis parallel to the second rotation axis.

2. The optical beam steering mechanism of claim 1, wherein the first lens and the second lens are positioned substantially parallel to each other, and the arcuate path is in a plane substantially parallel to the first lens and the second lens.

3. The optical beam steering mechanism of claim 1, further comprising:

a first motor shaft extending from the first rotary motor;

a second motor shaft extending from the second rotary motor;

a first rotary position encoder configured to sense a rotary position of the first motor shaft; and a second rotary position encoder configured to sense a rotary position of the second motor shaft.

4. The optical beam steering mechanism of claim 3, further comprising:

an electronic controller configured to receive feedback from the first rotary position encoder and the second rotary position encoder, wherein the electronic controller is further configured to adjust positions of the first lens and the second lens based on the feedback.

5. The optical beam steering mechanism of claim 1, further comprising:

a first arm operatively coupled to the first motor and configured to hold the first lens, the first arm defining a first radius from a first rotation axis of the first rotary motor to a center of the first lens; and a second arm operatively coupled to the second motor and configured to hold the second lens, the second arm defining a second radius from a second rotation axis of the second rotary motor to a center of the second lens.

6. The optical beam steering mechanism of claim 5, wherein the first and second radii are substantially perpendicular to each other when the first and second lenses are centered.

7. The optical beam steering mechanism of claim 5, wherein the first and second radii are 45 to 135 degrees from each other when the first and second lenses are centered.

8. The optical beam steering mechanism of claim 1, wherein the first lens and the second lens are spaced from each other by a distance, wherein the distance is 5% of the first magnitude or less.

9. An optical instrument comprising:

a source of electromagnetic radiation generating an optical beam;

a sample stage for holding a sample;

a detector for receiving light from the sample; and at least one optical beam steering mechanism of claim 1, wherein the optical beam steering mechanism is configured to either direct the optical beam to the sample stage or direct the light from the sample to the detector.

10. The optical instrument of claim 9, wherein the detector is a spectrograph, and the source of electromagnetic radiation is configured to emit an illuminating light suited for Raman spectroscopy.

11. The optical instrument of claim 9, wherein the optical beam steering mechanism includes a first rotary motor coupled to the first lens, a second rotary motor coupled to the second lens, a first rotary position encoder coupled to the first rotary motor, a second rotary position encoder coupled to the second rotary motor, and the optical instrument further comprising:

an electronic controller configured to receive feedback from the first rotary position encoder and the second rotary position encoder, wherein the electronic controller is further configured to maintain positions of the first lens and the second lens relative to the optical beam based on the feedback as long as the optical instrument is powered ON.

12. The optical instrument of claim 11, wherein the electronic controller is further configured to operate the first rotary motor and the second rotary motor to align either the optical beam with respect to the sample or the light from the sample with respect to a spectrograph, and store positions of the first and second rotary position encoders which corresponds to calibrated positions of the first lens and the second lens.

13. The optical instrument of claim 12, wherein the electronic controller is further configured to continuously supplying electrical power to the rotary motor to maintain the first lens and the second lens at the calibrated positions while sample data is acquired by the optical instrument.

14. The optical instrument of claim 9, wherein the at least one optical beam steering mechanism configured to either direct the optical beam to the sample stage or direct the light from the sample to the detector includes, a first optical beam steering mechanism configured to direct the optical beam to the sample stage, and a second optical beam steering mechanism configured to direct the light from the sample to the detector.

15. A method for aligning a beam in an optical instrument, the method comprising:

powering ON the optical instrument including first and second lenses driven respectively by first and second motors, and further including first and second motor position encoders, wherein the first and second lenses define focal lengths of substantially equal magnitude and opposite polarity, and wherein the second lens is positioned to directly receive the beam passing through the first lens;

actuating the first and second motors to respectively move the one or both of the first and second lenses to a calibrated position, wherein the calibrated position corresponds to a desired optical beam path alignment at which the beam passes through the first and second lenses;

maintaining power to the first and second motors as long as the optical instrument is powered ON; and using feedback from the first and second motor position encoders to maintain the calibrated position as long as the optical instrument is powered ON, wherein the first and second motors are rotary motors having a first rotation axis and a second rotation axis, respectively, wherein the first rotation axis is parallel to the second rotation axis, and wherein moving the one or both of the first and second lenses to the calibrated position includes actuating one or both of the first and second rotary motors to swing the one or both of the first and second lenses along their respective arcuate paths.

16. The method of claim 15, wherein powering ON the optical instrument includes powering ON a spectrographic microscope.

17. The method of claim 15, further comprising determining the calibrated position by imaging a reference sample while adjusting one or both of the motors and storing the calibrated position.

* * * * *